Figures 1, 2, 3:
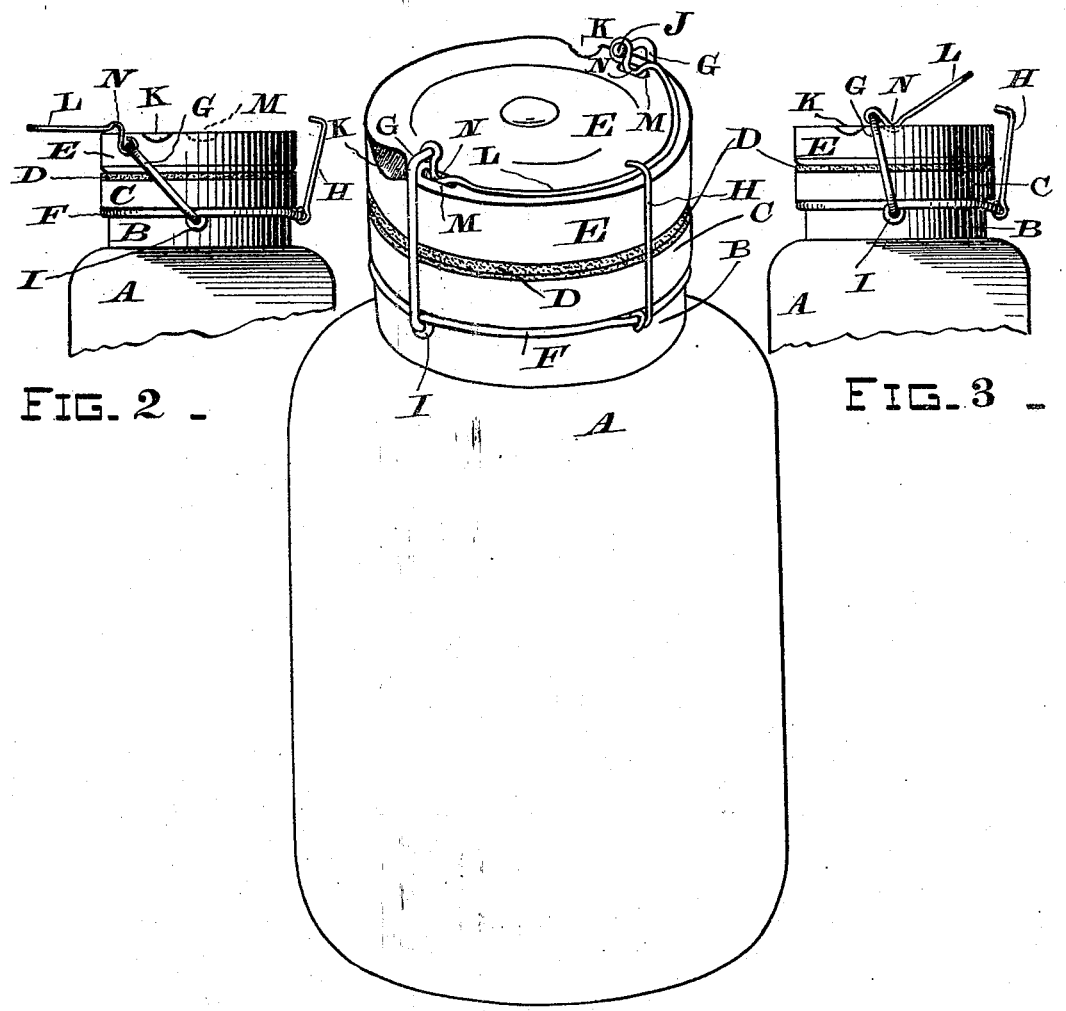

(No Model.)

J. G. BRIGGS.
FRUIT JAR.

No. 314,099. Patented Mar. 17, 1885.

WITNESSES  
Wilmer Bradford  
M. B. Woodworth

INVENTOR  
John G. Briggs  
By C. W. M. Smith  
Attorney.

UNITED STATES PATENT OFFICE.

JOHN G. BRIGGS, OF SAN JOSÉ, CALIFORNIA.

FRUIT-JAR.

SPECIFICATION forming part of Letters Patent No. 314,099, dated March 17, 1885.

Application filed November 28, 1884. (No model.)

*To all whom it may concern:*

Be it known that I, JOHN G. BRIGGS, of San José, in the county of Santa Clara and State of California, have invented a certain new and Improved Fruit-Preserving Jar, of which the following is a specification.

My invention relates to an improved fruit-preserving jar; and the object of my invention is to provide a jar or containing-vessel for fruits and vegetables in which a hinged lever is provided, by means of which the cover or lid is forced down and held air-tight and compactly upon and over the mouth of the jar. I attain this object by the means illustrated in the accompanying drawings, in which—

Figure 1 is a perspective view of my improved fruit-preserving jar. Fig. 2 is a side elevation of the upper portion of said jar, showing the hinged cover-fastening thrown back; and Fig. 3 is a side elevation showing the cover-fastening when about to be clamped down and made fast.

Similar letters of reference are made use of to designate like parts throughout the several views.

A represents the jar in its entirety, and of which B is the neck, and C the swell surmounting the neck. Within this swell the neck is contracted to form the opening or mouth of the jar, and upon the swell is laid an india-rubber band or washer, D, upon which the cover E rests.

Around the neck and beneath the swell I place the wire F, which is turned, coiled, or twisted in three places to form loops or pivotal bearings for the hinged bars G G and the catch H. The catch H is formed of a simple piece of wire with its upper end formed into a hook, while its lower end is coiled around or otherwise made fast to the loop or band of wire surrounding the neck of the jar. The bars G G are bent at their lower ends, and are hinged into the loops I in the wire F, as shown, while their upper ends are also bent and headed, as shown at J in Fig. 1.

The upper edge of the cover E is made with two diametrically-situated scallops, K K. These scallops are excisions from the edge of the cover E, made large enough to allow the easy passage over the cover of the bent ends J. When in practice, the hooked links G G and their curved connecting-rod L are swung back into the position shown in Fig. 2. Without them the bent ends could not pass the edge of the cover.

Upon the top of the cover E, and immediately to the rear of the scallops K K, before mentioned, are made two mortises or rounded recesses, M, which form a bearing and pivotal point, within which is turned or pivoted the downwardly-curved portion of the connecting-rod L, which approximately extends around one-half of the cover or lid E, and is held down in its clamped position by the catch H, as shown in Fig. 1.

In practice the hinged bars G G and their connecting bar or loop L are swung back into the position shown in Fig. 2, and the cover E is placed upon the jar. The operator then grasps the curved connecting bar or loop L and pulls it toward himself, when the hinged bars G G will pivot within their bearings, and the downwardly-curved portions N of the connecting-rod L will enter and pivot within the recesses M, and as the outer end of the curved connecting rod or loop L is forced down the leverage thereby acquired will force down and compress the cover E upon the india-rubber band or washer D surrounding the mouth of the jar, and thereby form an air-tight joint, which is maintained by the catch H.

Having thus fully described my invention, what I claim, and desire to secure by Letters Patent, is—

In a fruit preserving and containing jar, the cover-fastening herein described, consisting of a hinged curved lever working within recesses upon the face of the cover to compress said cover upon an india-rubber band surrounding the opening or mouth of the jar, in combination with the hinged side bars, G G, and catch H, for retaining said lever in its closed position, substantially as shown and described, for the purpose set forth.

In testimony that I claim the foregoing I have hereunto set my hand and seal.

JOHN G. BRIGGS. [L. S.]

Witnesses:
 WILMER BRADFORD,
 C. W. M. SMITH.